(12) United States Patent
Qi et al.

(10) Patent No.: US 10,023,440 B2
(45) Date of Patent: Jul. 17, 2018

(54) SYSTEM AND METHOD FOR MEASURING SAFETY CLEARANCE BETWEEN THE STEPS AND SKIRT PANELS OF AN ESCALATOR AND POSITIONING HIDDEN DANGERS

(71) Applicants: ZHUHAI BRANCH, GUANGDONG INSTITUTE OF SPECIAL EQUIPMENT INSPECTION AND RESEARCH, Zhuhai (CN); ZHUHAI ANYES TECHNOLOGY CO., LTD., Zhuhai (CN)

(72) Inventors: Zhengwu Qi, Zhuhai (CN); Minjian Liang, Zhuhai (CN); Yinghong Chen, Zhuhai (CN)

(73) Assignees: ZHUHAI BRANCH, GUANGDONG INSTITUTE OF SPECIAL EQUIPMENT INSPECTION AND RESEARCH (CN); ZHUHAI ANYES TECHNOLOGY CO., LTD. (CN)

( * ) Notice: Subject to any disclaimer, the term of this patent is extended or adjusted under 35 U.S.C. 154(b) by 0 days.

(21) Appl. No.: 15/608,408

(22) Filed: May 30, 2017

(65) Prior Publication Data

US 2018/0148300 A1     May 31, 2018

(30) Foreign Application Priority Data

Nov. 29, 2016   (CN) .......................... 2016 1 1078091

(51) Int. Cl.
| | |
|---|---|
| B66B 27/00 | (2006.01) |
| B66B 25/00 | (2006.01) |
| B66B 29/00 | (2006.01) |
| G06F 11/07 | (2006.01) |

(52) U.S. Cl.
CPC ........ *B66B 29/005* (2013.01); *G06F 11/0742* (2013.01)

(58) Field of Classification Search
None
See application file for complete search history.

(56) References Cited

U.S. PATENT DOCUMENTS

| | | | | |
|---|---|---|---|---|
| 4,413,719 A | * | 11/1983 | White ..................... | B66B 23/14 |
| | | | | 198/333 |
| 8,396,588 B2 | * | 3/2013 | Senger .................. | B66B 29/005 |
| | | | | 700/230 |

* cited by examiner

*Primary Examiner* — Kavel Singh
(74) *Attorney, Agent, or Firm* — J. A. Lindeman & Co., PLLC (57) ABSTRACT

The present disclosure discloses a system and method for measuring safety clearance between the steps and skirt panels of an escalator and positioning hidden dangers and, which improves the working efficiency of the detecting personnel and reduces labor intensity; the system and method of the present disclosure has high accuracy, and eliminates the detection error caused by manual observation and the sense of responsibility, thus helping the detecting personnel to comprehensively detect the hidden dangers to minimize the escalator safety accidents caused by such hidden dangers; and its accurate hidden danger positioning function can help the maintenance personnel to carry out maintenance and adjustment faster. Therefore, the present disclosure is of great significance to the safe operation of the escalator and the personal safety of the passengers, and plays a positive role in promoting the development of the whole quality supervision.

8 Claims, 8 Drawing Sheets

SYSTEM AND METHOD FOR MEASURING SAFETY CLEARANCE BETWEEN THE STEPS AND SKIRT PANELS OF AN ESCALATOR AND POSITIONING HIDDEN DANGERS

FIELD OF THE INVENTION

The present disclosure relates to the field of an escalator or a passenger conveyor, in particular to a system and method for measuring safety clearance between the steps and skirt panels of an escalator and positioning hidden dangers.

BACKGROUND OF THE INVENTION

When an escalator runs, an excessive clearance between the steps and skirt panels at two sides tends to cause foreign matters or fingers and toes of children to be trapped, resulting in damage of the escalator or casualties. In recent years, trapping of fingers, toes or rubber shoes of children in the clearance between the moving steps and skirt panels occurs frequently, which causes personal injuries. When the inspection agency of the quality supervision department carries out supervision and regular inspection on the escalator, the clearance between the steps and skirt panels is also required to be detected, which, according to the requirements of national standard, it should be not more than 4 mm at one side, with the sum of the clearance at both sides being not more than 7 mm.

Currently, however, detection and measurement of the clearance between the steps and skirt panels is generally conducted manually using a filler gauge or a straight steel ruler after the escalator stops at home and abroad since there is no professional detecting instruments and equipment, and there are mainly the following problems: first, there is a difference between the results detected when the steps stop and those when the steps move (due to the shake of the steps when the escalator runs caused by wears of the guide rails and pulleys); second, it is inefficient to perform manual measurement using the steel rule (filler gauge), and thus is difficult to measure all the clearances, so that some hidden dangers may be easily omitted; third, conclusion determinations are easily influenced due to the low resolution of the straight steel ruler and the filler gauge as well as large errors from personnel reading, especially when the data is close to a critical value.

SUMMARY OF THE INVENTION

In order to overcome the above deficiencies in the prior art, the present disclosure provides a high accuracy and high efficiency system and method, for measuring safety clearance between the steps and skirt panels of an escalator, and for positioning hidden dangers.

The technical solution adopted by the present disclosure to solve its technical problems is as follows.

A system for measuring safety clearance between steps and skirt panels of an escalator and positioning hidden dangers, wherein it comprises a terminal, a distance measurement subsystem and a clearance measurement subsystem communicating with the terminal;
the distance measurement subsystem is used for measuring a running distance of the steps in real time and transmitting the measured distance data information to the terminal for processing;
the clearance measurement subsystem is used for detecting variations in the clearance between the steps and skirt panels in real time and transmitting the clearance data information to the terminal for processing; and
the terminal is used for acquiring the above data information of the distance measurement subsystem and the clearance measurement subsystem for processing and display.

As a further improvement to the technical solution, the distance measurement subsystem comprises a distance measurement device and a distance lower computer processing module (or referred to as lower level processing module for distance).

As a further improvement to the technical solution, the distance measurement device comprises a rubber wheel and a rotary encoder connected by a coupling, and is fixed on a horizontal segment of the skirt panel of the escalator via a scaffold with a sucking disc.

As a further improvement to the technical solution, the distance lower computer processing module comprises a microprocessor CPU which is connected with a data storage and a wireless communication circuit, respectively, an input end of the microprocessor CPU is connected with a charging and power supply circuit and a step running distance measurement circuit, the charging and power supply circuit is connected with a rechargeable lithium battery, an input end of the step running distance measurement circuit is connected with a pulse shaping circuit, and the distance lower computer processing module communicates with the terminal through the wireless communication circuit.

As a further improvement to the technical solution, the clearance measurement subsystem comprises a sensor base, a sensor mounted on the sensor base and a clearance lower computer processing module (or referred to as lower level processing module for clearance).

As a further improvement to the technical solution, the sensor is a contact type displacement sensor.

As a further improvement to the technical solution, the sensor base comprises a clamping base and a clamping plate hooked at an upper end of the clamping base, wherein the clamping base is provided with a first through hole and the clamping plate is provided with a second through hole at a position corresponding to the first through hole in the clamping base, the clamping base is connected with the clamping plate via a fastener passing through both the first through hole and the second through hole, and the lower ends of the clamping base and the clamping plate are inserted into the tooth slots of an escalator footboard at the same time.

As a further improvement to the technical solution, the clearance lower computer processing module comprises a microprocessor CPU which is connected with the data storage and the wireless communication circuit, respectively, an input end of the microprocessor CPU is connected with the charging and power supply circuit and an A/D converter, the charging and power supply circuit is connected with the rechargeable lithium battery, an input end of the A/D converter is connected with a signal conversion circuit, and the clearance lower computer processing module communicates with the terminal through the wireless communication circuit.

A method for measuring safety clearance between the steps and skirt panels of an escalator and positioning hidden dangers, wherein it comprises the following steps:
1) preparation for measurement;
2) the escalator is made to run at a speed for maintenance, wherein the rubber wheel of the distance measurement subsystem moves along with the steps, the rotary encoder generates pulse signals, the pulse shaping circuit performs shaping and anti-interference to the pulse signals transmitted by the rotary encoder and then sends the pulse signals to the step running distance measurement circuit for calculation so as to derive the step running speed and distance which are sent to the clearance measurement subsystem and the terminal through the wireless communication circuit in real time under the control of the microprocessor CPU;

3) the signal conversion circuit converts the resistance signals of the displacement sensor into the voltage signals and performs A/D conversion of the voltage signals under the control of the microprocessor CPU which calculates a variation amount of the clearance and sends it to the terminal through the wireless communication circuit in real time;

4) the terminal acquires the data information of the clearance measurement subsystem and the distance measurement subsystem in real time, adds the clearance variation amount to an initial value of the clearance to obtain a clearance value of a real-time position, and then processes, displays and stores the clearance value and the real-time distance derived in step 2) corresponding to the clearance value; and 5) when the clearance measurement subsystem reaches an exit, the escalator stops running, and the test ends.

As a further improvement to the technical solution, the step 1) comprises the following specific steps:

a) marking of an initial position: a mark is made using a marking pen at positions of left-right symmetry of the skirt panels, at the entrance of the escalator, respectively, i.e., a zero movement position of the sensor, and the clearance value between the steps and skirt panels of the escalator at the two marked positions are measured using a straight ruler or a filler gauge as the initial values of the clearance;

b) installation of the clearance measurement subsystem: the displacement sensor is mounted and fixed on the sensor mounting base, the clamping base and the clamping plate of the sensor mounting base are adjusted to ensure that the displacement sensors at both sides coincide with the two marks made in step a), and the fastener is rotated to mount and fix the displacement sensor on the step footboard of the escalator;

c) Installation of the distance measurement subsystem: the distance measurement device is fixed on the escalator through the sucking disc on the scaffold, and the swing arm of the scaffold is adjusted to cause the rubber wheel to fit tightly to the horizontal segment of the steps of the escalator;

d) system startup: the power switches of the terminal, the clearance lower computer processing module and the distance lower computer processing module are turned on, and a terminal test software is launched and started to perform communication detection; and if the communication is good, the process proceeds to the next step;

e) setting of basic information: the ID number of the escalator to be detected and corresponding data information to be detected are input in a parameter setting option; and f) setting of initial values: the initial clearance values measured in step a) are input into the system.

The present disclosure has the following beneficial effects: the system and method for measuring safety clearance between the steps and skirt panels of an escalator and positioning hidden dangers according to the present disclosure improve the working efficiency of the detecting personnel and reduce labor intensity; the system and method of the present disclosure have high accuracy, and eliminate the detection errors caused by manual observation and the sense of responsibility, thus helping the detecting personnel to comprehensively detect the hidden dangers to minimize the escalator safety accidents caused by such hidden dangers; and its accurate hidden danger positioning function can help the maintenance personnel to carry out maintenance and adjustment faster. Therefore, the present disclosure is of great significance to the safe operation of the escalator and the personal safety of the passengers, and plays a positive role in promoting the development of the whole quality supervision.

BRIEF DESCRIPTION OF THE DRAWINGS

The present application will be further illustrated below in combination with drawings and specific embodiments, in which.

DETAILED DESCRIPTION OF THE EMBODIMENTS

Figure 1:
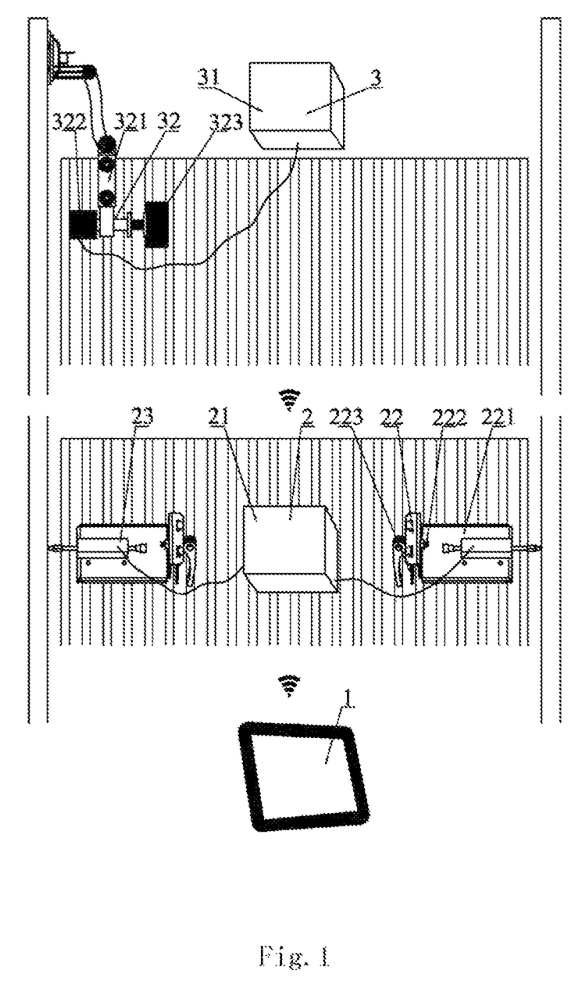
FIG. 1 is a structural representation of the present disclosure.
Figure 2:
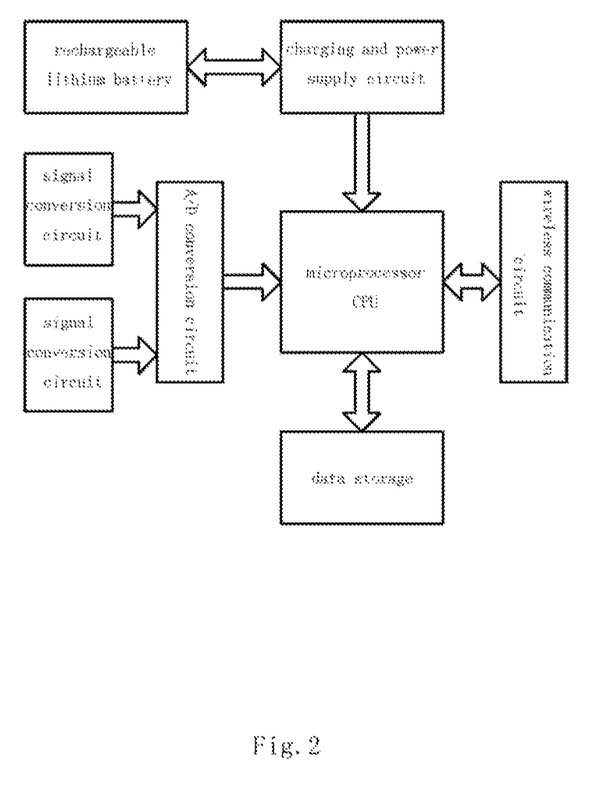
FIG. 2 is a functional block diagram of a clearance measurement lower computer processing module of the present disclosure.

Referring to FIG. 1 and FIG. 2, a system for measuring safety clearance between the steps and skirt panels of the escalator and positioning hidden dangers, wherein it comprises a terminal 1, a clearance measurement subsystem 2 and a distance measurement subsystem 3 communicating with the terminal;

the distance measurement subsystem 3 is used for measuring a running distance of the steps in real time and transmitting the measured distance data information to the terminal for processing;

the clearance measurement subsystem 2 is used for detecting variations in the clearance between the steps and skirt panels in real time and transmitting the clearance data information to the terminal for processing; and the terminal 1 is used for acquiring the above data information of the distance measurement subsystem and the clearance measurement subsystem for processing and display.

The distance measurement subsystem 3 comprises a distance measurement device 32 and a distance lower computer processing module 31.

Figure 3:
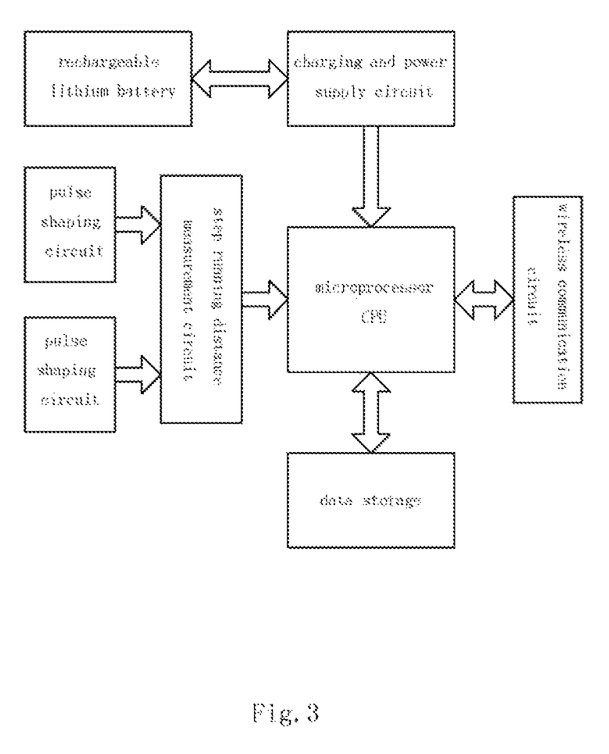
FIG. 3 is a functional block diagram of a distance measurement lower computer processing module of the present disclosure.

The distance measurement device 32 comprises a rubber wheel 323 and a rotary encoder 322 connected by a coupling and is fixed on a horizontal segment of the skirt panel of the escalator via a scaffold 321 with a sucking disc. The distance lower computer processing module 31 comprises a microprocessor CPU which is connected with a data storage and a wireless communication circuit, respectively, an input end of the microprocessor CPU is connected with a charging and power supply circuit and a step running distance measurement circuit, the charging and power supply circuit is connected with a rechargeable lithium battery, an input end of the step running distance measurement circuit is connected with a pulse shaping circuit, and the distance lower computer processing module communicates with the terminal 1 through the wireless communication circuit.

Figure 5:
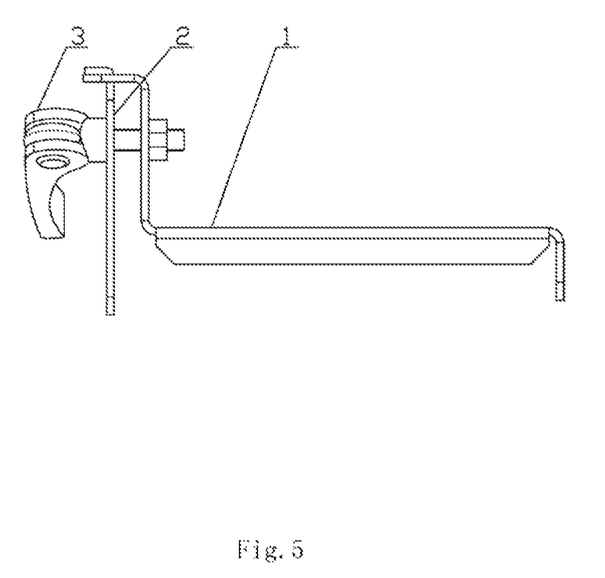
FIG. 5 is a structural representation of a sensor base of the present disclosure.

The clearance measurement subsystem 2 comprises a sensor base 22, a sensor 23 mounted on the sensor base 22 and a clearance lower computer processing module 21. The sensor 23 comprises a contact type displacement sensor. Referring to FIG. 5, the sensor base 22 comprises a clamping base 221 and a clamping plate 223 hooked at an upper end of the clamping base 221, and the clamping base 221 is provided with a first through hole and the clamping plate 223 is provided with a second through hole at a position corresponding to the first through hole in the clamping base 221, the clamping base 221 is connected with the clamping plate 223 via a fastener 222 passing through both the first through hole and the second through hole, and lower ends of the clamping base 221 and the clamping plate 223 are inserted into the tooth slots of an escalator footboard at the same time.

Figure 6:
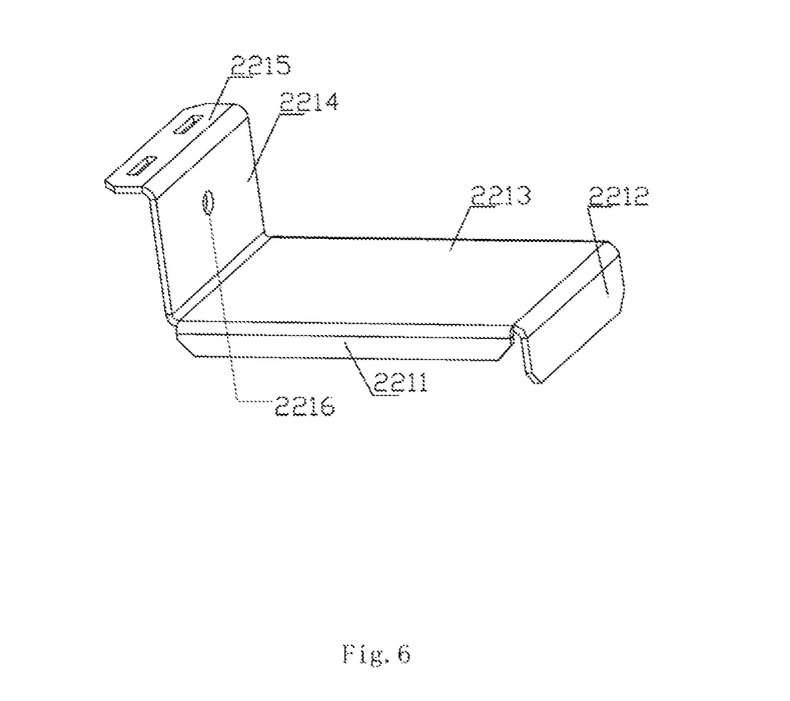
FIG. 6 is a structural representation of a clamping base of the present disclosure.
Figure 7:
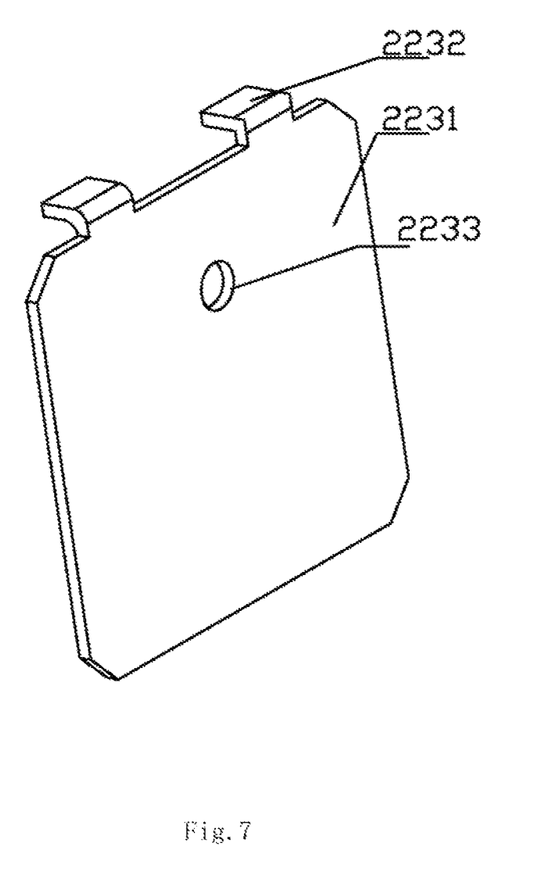
FIG. 7 is a structural representation of a clamping plate of the present disclosure.
Figure 8:
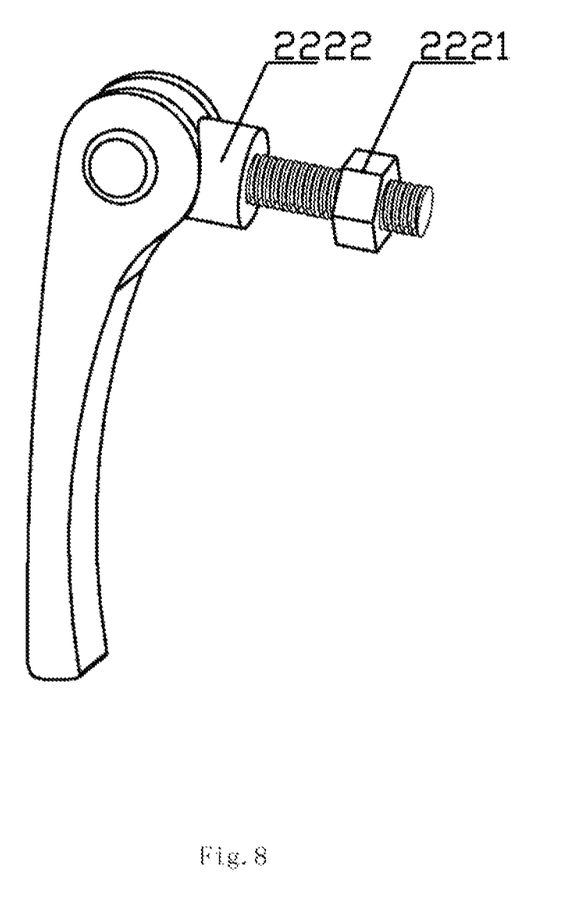
FIG. 8 is a structural representation of a fastener of the present disclosure.

Referring to FIG. 6, the clamping base 221 comprises a reference surface 2213 parallel to the escalator footboard, positioning surfaces 2211 arranged vertically downward at the front and rear sides of the reference surface 2213, a clamping surface 2212 arranged vertically downward at the right side of the reference surface 2213, an auxiliary surface 2214 arranged vertically upward at the left side of the reference surface 2213, and an installation surface 2215 parallel to the reference surface and vertical to the auxiliary surface, and the first through hole 2216 being disposed in the auxiliary surface 2214. Further referring to FIG. 7, the clamping plate 223 comprises a clamping surface 2231 and connection hooks 2232 connected vertically upward with the left side of the clamping surface, the clamping surface 2231 is parallel to the auxiliary surface 2214 of the clamping base 221, the installation surface 2215 is provided with two openings, the connection hooks 2232 pass through the two openings to be hooked on the installation surface 2215, and the second through hole 2233 is disposed on the clamping surface 2231. FIG. 8 is a structural representation of the fastener. The fastener 222 comprises a cam-type clamping lever 32 and a nut 2221 sleeved on the clamping lever, the clamping lever 2222 passes through the first through hole 2216 and the second through hole 2233. When in use, the connection hooks 2232 of the clamping plate 223 are connected to the two openings in the installation surface 2215 of the clamping base 221. A proper position is selected on a step footboard of the escalator or the passenger conveyor, and adjustment is made to the position of the clamping plate 223 to insert the clamping surface 2231 of the clamping plate 223 and the clamping surface 2212 of the clamping base 221 into the tooth slots of the escalator footboard, then the positioning surface 2211 fits tightly with the step footboard to act a positioning function. The cam-type clamping lever 2222 of the fastener 222 passes through the through holes in the clamping plate 223 and the auxiliary surface 2214 of the clamping base 221, and the nut 2221 is mounted to the cam-type clamping lever 2222 and rotated to preliminarily clamp the device to the step footboard. Finally, a handle on the cam-type clamping lever 2222 is rotated to allow the base to be reliably fixed on the step footboard, and then the sensor used for detection is mounted to the reference surface 2213 to perform inspection tests.

The clearance lower computer processing module 21 comprises a microprocessor CPU which is connected with the data storage and the wireless communication circuit, respectively, an input end of the microprocessor CPU is connected with the charging and power supply circuit and an A/D converter, the charging and power supply circuit is connected with the rechargeable lithium battery, an input end of the A/D converter is connected with a signal conversion circuit, and the clearance lower computer processing module communicates with the terminal through the wireless communication circuit.

When the clearance measurement subsystem 2 for detecting the variation of the clearance between the steps and skirt panels is installed, two marks are made using a marking pen at positions of left-right symmetry of the skirt panels, at the entrance of the escalator, respectively, (as a zero movement position of the sensor), and the clearance between the steps and skirt panels of the escalator at the two marked positions are measured using a straight ruler or a filler gauge. The displacement sensor 23 is fixedly mounted on the sensor mounting base 22, the clamping base 221 and the clamping plate 223 of the sensor mounting base 22 are adjusted to ensure that the moving ends of the displacement sensors 23 at both sides coincide with the two marks, and the fastener 222 is rotated to fixedly mount the displacement sensor 23 on the step footboard of the escalator. The clearance lower computer processing module 21, which is placed on the step footboard, is an embedded system powered by the lithium battery, taking CPU as a core and internally provided with the signal conversion circuit. The resistance signals sent by the displacement sensor 23 are converted by the signal conversion circuit into the voltage signals, high-resolution A/D conversion is performed under the control of the CPU which calculates and derives an accurate variation amount of the clearance, and the variation amount is then sent to the terminal 1 in real time through the wireless communication circuit.

When the distance measurement subsystem 3 for monitoring the step running distance in real time is installed, the rubber wheel 323 is coaxially connected with the rotary encoder 322, the scaffold 321 is fixed on the skirt panels at a horizontal segment of the escalator, and a swing arm of the scaffold 321 is adjusted to make the rubber wheel 323 of the sensor to fit tightly to the steps at the horizontal segment of the escalator. The rubber wheel 323 in direct contact with the escalator is preferably a wear-resistance rubber wheel and is coaxially connected with the rotary encoder 323 by an elastic coupling. When the rubber wheel 323 rotates with the escalator, the rotary encoder 322 rotates synchronously and generates pulse signals. The distance lower computer processing module is placed outside the steps, as shown in FIG. 3, it is also an embedded system module powered by the lithium battery, taking CPU as a core and internally provided with the pulse shaping circuit. The pulse shaping circuit performs shaping and anti-interference to the pulse signals sent by the rotary encoder, and then sends the pulse signals to the step speed and running distance measurement circuit for calculation so as to derive accurate step speed and running distance which are then sent to the terminal 1 through the wireless communication circuit in real time under the control of the CPU.

Figure 4:
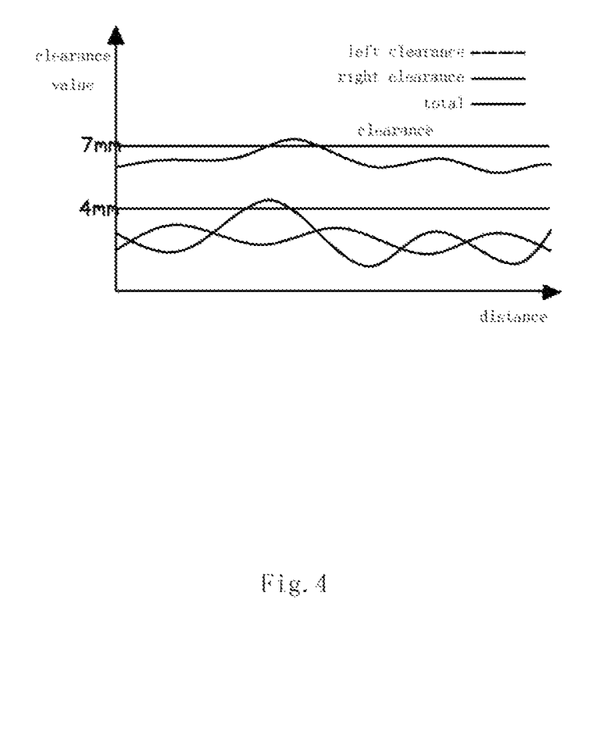
FIG. 4 is a display illustration of the measurement of the present disclosure.

After installation, the system is activated. Power switches of the terminal 1, the clearance lower computer processing module 21 and the distance lower computer processing module 31 are turned on. A test software of the terminal 1 is launched and the system is activated to perform communication detection; and if the communication is good, the process proceeds to the next step. Parameter setting is performed on the test software of the terminal 1, and the ID number of the escalator to be detected, corresponding data information to be detected and the clearance value at the initial position for measurement are input into the system. The escalator is made to run at a speed for maintenance, the rubber wheel 323 of the distance measurement subsystem 3 moves along with the steps, the rotary encoder 322 generates pulse signals, the pulse shaping circuit performs shaping and anti-interference to the pulse signals sent by the rotary encoder 322 and then sends the pulse signals to the step speed and running distance measurement circuit for calculation so as to derive the accurate step speed and running distance which are sent to the clearance measurement subsystem 2 and the terminal 1 through the wireless communication circuit in real time under the control of the CPU. After receiving the signals from the distance measurement subsystem 3, the clearance measurement subsystem 2 converts the resistance signals from the displacement sensor 23 into the voltage signals, performs high-resolution A/D conversion under the control of the CPU which derives an accurate variation amount of the clearance through calculation, and sends the variation amount to the terminal 1 in real time through the wireless communication circuit. The terminal 1 acquires the data information of the clearance measurement subsystem 2 and the distance measurement subsystem 3 in real time, adds the clearance variation amount to the initial value of the clearance to obtain a clearance value of a real-time position, and processes the clearance value and the distance. As shown in FIG. 4, the horizontal axis represents the distance signals fed back by the distance measurement subsystem 3, while the longitudinal axis represents the clearance value signals. Three curves representing, the clearances between the escalator steps and the skirt panels at both sides, and the sum of the clearances at the left and right symmetrical positions on two sides, are respectively plotted and stored as data files. When the clearance between the steps and the skirt panel at one side exceeds 4 mm, or the sum of the clearances at the left and right symmetrical positions on two sides exceeds 7 mm, the curves exhibit a red color, thus facilitating the positioning of hidden dangers. When the clearance measurement subsystem 2 reaches the other exit, the escalator stops running, and the test ends, and graph and data files are stored by the test software. Hidden dangers can be detected and positioned by checking the images and data stored in the terminal 1, thus guiding enterprises to implement rectification.

A method for measuring safety clearance between steps and skirt panels of an escalator and positioning hidden dangers, wherein the method comprises steps of:

1) preparation for measurement;

a) marking of an initial position: a mark is made using a marking pen at positions of left-right symmetry of the skirt panels, at the entrance of the escalator, respectively, i.e., a zero movement position of the sensor, and the clearance value between the steps and skirt panels of the escalator at the two marked positions are measured using a straight ruler or a filler gauge as the initial values of the clearance;

b) installation of the clearance measurement subsystem: the displacement sensor is mounted and fixed on the sensor mounting base, the clamping base and the clamping plate of the sensor mounting base are adjusted to ensure that the displacement sensors at both sides coincide with the two marks made in step a), and the fastener is rotated to mount and fix the displacement sensor on the step footboard of the escalator;

c) Installation of the distance measurement subsystem: the distance measurement device is fixed on the escalator through the sucking disc of the scaffold, and the swing arm of the scaffold is adjusted to cause the rubber wheel to fit tightly to the horizontal segment of the steps of the escalator;

d) system startup: the power switches of the terminal, the clearance lower computer processing module and the distance lower computer processing module are turned on, and a terminal test software is launched and started to perform communication detection; and if the communication is good, the process proceeds to the next step;

e) setting of basic information: the ID number of the escalator to be detected and corresponding data information to be detected are input in a parameter setting option; and f) setting of initial values: the initial clearance values measured in step a) are input into the system.

2) the escalator is made to run at a speed for maintenance, wherein the rubber wheel of the distance measurement subsystem moves along with the steps, the rotary encoder generates pulse signals, the pulse shaping circuit performs shaping and anti-interference to the pulse signals transmitted by the rotary encoder and then sends the pulse signals to the step running distance measurement circuit for calculation so as to derive the step running speed and distance which are sent to the clearance measurement subsystem and the terminal by the wireless communication circuit in real time under the control of the microprocessor CPU;

3) the signal conversion circuit converts the resistance signals of the displacement sensor into the voltage signals and performs A/D conversion of the voltage signals under the control of the microprocessor CPU which calculates a variation amount of the clearance and sends it to the terminal by the wireless communication circuit in real time;

4) the terminal acquires the data information of the clearance measurement subsystem and the distance measurement subsystem in real time, adds the clearance variation amount to an initial value of the clearance so as to obtain a clearance value of a real-time position, and then processes, displays and stores the clearance value and the real-time distance derived in step 2) corresponding to the clearance value; and 5) when the clearance measurement subsystem reaches an exit, the escalator stops running, and the test ends.

The above are merely the preferred embodiments of the present invention, but the present invention is not limited thereto, and all embodiments should belong to the protection scope of the present invention so long as they achieve the technical effects of the present invention by the same or similar means.

What is claimed is:

1. A system for measuring safety clearance between steps and skirt panels of an escalator and positioning hidden dangers, wherein the system comprises:

a distance measurement subsystem communicating with a terminal, wherein the distance measurement subsystem is used for measuring a running distance of the steps in real time and transmitting the measured distance data information to the terminal for processing, wherein the distance measurement subsystem comprises a distance measurement device and a distance lower computer processing module, wherein the distance measurement device comprises: a rubber wheel, and a rotary encoder connected with the rubber wheel by a coupling, wherein the distance measurement device is fixed on a horizontal segment of the skirt panel of the escalator via a scaffold with a sucking disc;

a clearance measurement subsystem, wherein the clearance measurement subsystem is used for detecting the variations in the clearance between the steps and skirt panels in real time and transmitting the clearance data information to the terminal for processing; and a terminal, wherein the terminal is used for acquiring the data information of the distance measurement subsystem and the clearance measurement subsystem for processing and display.

2. The system for measuring safety clearance between steps and skirt panels of an escalator and positioning hidden dangers according to claim 1, wherein the distance lower computer processing module comprises:
   a microprocessor CPU connected with a data storage and a wireless communication circuit, respectively, wherein an input end of the microprocessor CPU is connected with a step running distance measurement circuit and a charging and power supply circuit;
   a data storage;
   a wireless communication circuit, wherein the distance lower computer processing module communicates with the terminal through the wireless communication circuit;
   a charging and power supply circuit connected with a rechargeable lithium battery;
   a step running distance measurement circuit, wherein an input end of the step running distance measurement circuit is connected with a pulse shaping circuit;
   a pulse shaping circuit.

3. The system for measuring safety clearance between steps and skirt panels of an escalator and positioning hidden dangers according to claim 1, wherein the clearance measurement subsystem comprises:
   a sensor base;
   a sensor mounted on the sensor base; and
   a clearance lower computer processing module.

4. The system for measuring safety clearance between steps and skirt panels of an escalator and positioning hidden dangers according to claim 3, wherein the sensor comprises a contact type displacement sensor.

5. The system for measuring safety clearance between steps and skirt panels of an escalator and positioning hidden dangers according to claim 3, wherein the sensor base comprises:
   a clamping base, wherein the clamping base is provided with a first through hole;
   a clamping plate hooked at an upper end of the clamping base, wherein the clamping plate is provided with a second through hole at a position corresponding to the first through hole in the clamping base, and the lower ends of the clamping base and the clamping plate are inserted into tooth slots of an escalator footboard at the same time;
   a fastener, wherein the clamping base is connected with the clamping plate via the fastener passing through both the first through hole and the second through hole.

6. The system for measuring safety clearance between steps and skirt panels of an escalator and positioning hidden dangers according to claim 3, wherein the clearance lower computer processing module comprises:
   a microprocessor CPU connected with a data storage and wireless communication circuit, respectively, wherein an input end of the microprocessor CPU is connected with a charging and power supply circuit and an A/D converter;
   a data storage;
   a signal conversion circuit;
   an A/D converter, wherein an input end of the A/D converter is connected with the signal conversion circuit;

a charging and power supply circuit connected with a rechargeable lithium battery; and a wireless communication circuit, wherein the clearance lower computer processing module communicates with the terminal through the wireless communication circuit.

7. A method for measuring safety clearance between steps and skirt panels of an escalator and positioning hidden dangers, wherein the method comprises:
   1) preparing the escalator for measurement;
   2) running the escalator at a speed for maintenance, including
      moving a rubber wheel of a distance measurement subsystem along with the steps,
      generating pulse signals with a rotary encoder connected to the rubber wheel as the rubber wheel moves,
      shaping the pulse signals generated by the rotary encoder and correcting for interference in the pulse signals with a pulse shaping circuit and
      sending the pulse signals to a step running distance measurement circuit;
      calculating and deriving step running speed and distance with the step running distance measurement circuit;
      sending the step running speed and distance to a clearance measurement subsystem and a terminal in real time by a wireless communication circuit controlled by a microprocessor CPU;
   3) converting resistance signals of a displacement sensor into voltage signals with a signal conversion circuit,
      performing A/D conversion to the voltage signals with the microprocessor CPU by calculating a variation amount of clearance and sending the variation amount of clearance to the terminal in real time by a wireless communication circuit;
   4) acquiring, with the terminal, data information of the clearance measurement subsystem and the distance measurement subsystem in real time, wherein the clearance variation amount is added to an initial value of the clearance to obtain a clearance value of a real-time position, and then
      processing, displaying, and storing the clearance value and the real-time distance derived in step 2) corresponding to the clearance value; and
   5) stopping the escalator from running when the clearance measurement subsystem reaches an exit, and
      ending the test.

8. The method for measuring safety clearance between steps and skirt panels of an escalator and positioning hidden dangers according to claim 7, wherein step 1) comprises:
   a) marking an initial position including
      marking positions of left-right symmetry of the skirt panels and the entrance of the escalator, respectively, as zero movement positions of the sensor, and
      measuring a clearance value between the steps and skirt panels of the escalator at the two marked positions using a straight ruler or a filler gauge as the initial value of the clearance;
   b) installing the clearance measurement subsystem including
      mounting and affixing displacement sensors on a sensor mounting base,
      adjusting a clamping base and a clamping plate of the sensor mounting base to ensure that the displacement sensors coincide with the marks made in step a), and rotating a fastener to mount and affix one displacement sensor on a step footboard of the escalator;
c) installing the distance measurement subsystem including
affixing the distance measurement subsystem on the escalator through a sucking disc on a scaffold, and
adjusting a swing arm of the scaffold to cause the rubber wheel to directly contact a horizontal segment of the steps of the escalator;
d) starting up the microprocessor CPU including
turning on a power switch of the terminal, a clearance lower computer processing module and a distance lower computer processing module
launching a terminal test software program with the microprocessor CPU
detecting communication between the microprocessor CPU and the terminal, the clearance lower computer processing module, and the distance lower computer processing module; and when the communication is detected, proceeding to step e);
e) setting basic information including inputting an ID number of the escalator to be detected and corresponding data information to be detected in a parameter setting option; and
f) setting initial values including inputting the initial values of the clearance measured in step a) into the microprocessor CPU.

\* \* \* \* \*